United States Patent
Park et al.

(10) Patent No.: US 8,151,090 B2
(45) Date of Patent: Apr. 3, 2012

(54) SEQUENTIALLY PROPAGATING INSTRUCTIONS OF THREAD THROUGH SERIALLY COUPLED PES FOR CONCURRENT PROCESSING RESPECTIVE THREAD ON DIFFERENT DATA AND SYNCHRONIZING UPON BRANCH

(75) Inventors: Gi-Ho Park, Seoul (KR); Shin-Dug Kim, Goyang-si (KR); Jung-Wook Park, Seoul (KR); Hoon-Mo Yang, Seoul (KR); Sung-Bae Park, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 512 days.

(21) Appl. No.: 12/372,469

(22) Filed: Feb. 17, 2009

(65) Prior Publication Data
US 2010/0211757 A1 Aug. 19, 2010

(51) Int. Cl.
*G06F 15/80* (2006.01)
(52) U.S. Cl. .............................. 712/16; 712/19; 712/234
(58) Field of Classification Search ........................ None
See application file for complete search history.

(56) References Cited

U.S. PATENT DOCUMENTS

| 5,317,755 A | 5/1994 | Hartley et al. |
| 7,162,620 B2 * | 1/2007 | Magoshi ...................... 712/241 |
| 2002/0054594 A1 * | 5/2002 | Hoof et al. .................... 370/389 |
| 2004/0215889 A1 | 10/2004 | Cargnoni et al. |

FOREIGN PATENT DOCUMENTS

| KR | 100255728 | 2/2000 |
| KR | 1020030013767 | 2/2003 |

OTHER PUBLICATIONS

English Abstract for Publication No. 100255728, Feb. 16, 2000.
English Abstract for Publication No. 1020030013767, Feb. 15, 2003.

* cited by examiner

*Primary Examiner* — Kenneth Kim
(74) *Attorney, Agent, or Firm* — F. Chau & Associates, LLC (57) ABSTRACT

A systolic data processing apparatus includes a processing element (PE) array and control unit. The PE array comprises a plurality of PEs, each PE executing a thread with respect to different data according to an input instruction and pipelining the instruction at each cycle for executing a program. The control unit inputs a new instruction to a first PE of the PE array at each cycle.

15 Claims, 9 Drawing Sheets

OP1 : BASE ALU OP

OP2 : OP USING SHARED RESOURCES conf : STALL DUE TO AUTOMATIC COLLISION

NOP : NO NEXT OP

|        | T0  | T1  | T2  | T3  |
|--------|-----|-----|-----|-----|
| WARP #0 | OP0 | OP0 | OP0 | OP0 |
|        | OP1 | OP1 | OP1 | OP1 |
|        | OP2 | OP2 | OP2 | OP2 |
|        | NT  | NT  | T   | NT  |
| CYCLE  | OP3 | OP3 | NOP | OP3 |
|        | OP4 | OP4 | NOP | OP4 |
|        | OP5 | OP5 | NOP | OP5 |
|        | OP6 | OP6 | NOP | OP6 |
|        | NOP | NOP | OP5 | NOP |
|        | NOP | NOP | OP6 | NOP |
| WARP #1 | OP0 | OP0 | OP0 | OP0 |
|        | OP1 | OP1 | OP1 | OP1 |

FIG. 8B

|        | T0  | T1  | T2  | T3  |
|--------|-----|-----|-----|-----|
| WARP #0 | OP0 |     |     |     |
|        | OP1 | OP0 |     |     |
|        | OP2 | OP1 | OP0 |     |
|        | NT  | OP2 | OP1 | OP0 |
|        | OP3 | NT  | OP2 | OP1 |
| CYCLE  | OP4 | OP3 | T   | OP2 |
|        | NOP | NOP | NT  | OP5 → OP3 |
|        | OP5 | OP4 |     | OP4 |
|        | OP6 | OP5 |     | OP5  OP6 |
|        | NOP | OP6 |     | OP6 |
| WARP #1 | OP0 | NOP |     |     |
|        | OP1 | OP0 |     |     |
|        |     | OP1 | OP0 |     |
|        |     |     | OP1 | OP0 |
|        |     |     |     | OP1 |

SEQUENTIALLY PROPAGATING INSTRUCTIONS OF THREAD THROUGH SERIALLY COUPLED PES FOR CONCURRENT PROCESSING RESPECTIVE THREAD ON DIFFERENT DATA AND SYNCHRONIZING UPON BRANCH

BACKGROUND

1. Technical Field

The inventive concept relates to a systolic data processing apparatus and method, and more particularly, to an apparatus and method for systolic data processing while executing a parallel graphic shader program.

2. Discussion of Related Art

A Graphic processing unit (GPU) is a hardware structure for performing graphic rendering configured in a form of pipeline for fast performance of a fixed type rendering process, and improved parallelism thereof. Graphics rendering systems typically assume that objects to be rendered are made of polygons such as triangles. In the graphics system, each polygon is input to a graphics pipeline one vertex at a time. The GPU assembles the vertices into the corresponding polygons as needed to render the corresponding object. Since the advent of GPUs, support for various forms of shading effects on the vertexes has become an important point of the rendering technology. Accordingly, the GPU has developed into processor capable of executing a given shader program instead of the fixed type pipeline.

Furthermore, for improving performance, a parallel processing architecture in a form of single instruction multi data (SIMD) architecture or multiple instruction multiple data (MIMD) architecture may be employed. Particularly, a shader processor structure including a single program multiple data (SPMD) structure becomes a key technology for GPU operation, where the SPMD structure can improve parallelism with low control costs. To this end, a SIMD type hardware structure may be employed, to which the SPMD is most easily and effectively applicable. When executing a plurality of shader programs in the SIMD structure, a plurality of processing elements included in an array access identical operation resources such as Special Function Units (SFU) and Texture Caches (TC). In this time, efficiency of usage of the limited operation resources can be maximized only if each of the processing elements delays an execution time point in a systolic fashion. Furthermore, once a task switching method is adopted in the SIMD operation, an operation delay time due to cache misses can be substantially removed, however space is needed for storing operation statuses of the multiple threads. When the systolic scheme is applied, new threads can be allocated respectively to processing elements in which the cache misses have occurred without saving the operation statuses of the threads. Thus, substantially the same level of performance can be achieved without additional storage space.

In executing instructions such as general arithmetic logic unit (ALU) instructions, special instructions, texture instructions, etc., by the existed SIMD-based shader processor, the special instructions and texture instructions occupy only about 10% and 5%, respectively, of the shader program. In order to execute the special and texture instructions, however, all of the processing elements access the operation resources at the same time. Since the SPUs perform complicated mathematical functions, such as sin, cosine, log, sqrt, etc., the implementation of the SPUs is complicated. The implementation of TCs is costly, since a single cache has a single port in a cache memory.

Furthermore, each of a plurality of processing elements included in an SIMD structure executes a plurality of threads. When a cache miss occurs in at least one of the processing elements during execution of the shader program, operating statuses of all threads currently being executed are stored, and new threads are fetched and executed. Here, an additional storage space is needed for storing the operating statuses.

When a corresponding processing element stops operations of a cache-missed thread and waits until operations of all remaining threads are completed in order to save the storage space, partial processing element usage is significantly lowered, and thus overall performance significantly decreases.

Therefore, a need exists for a systolic data processing in a parallel graphic shader program.

SUMMARY OF THE INVENTION

According to an exemplary embodiment of the inventive concept, a data processing device includes a PE (processing element) array comprising a plurality of PEs, each PE executing a thread with respect to different data according to an input instruction and pipelining the instruction at each cycle for executing a single program; and a control unit inputting a new instruction to a first PE of the PE array at each cycle.

According to another exemplary embodiment of the inventive concept, a method of processing data includes fetching a new instruction to a first PE of a PE array at each cycle, and executing a plurality of threads with respective to different data in the PE array including the new instruction, the plurality of threads executing a program, wherein the new instruction is pipelined from the first PE to a next PE.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the drawings, anything irrelevant to descriptions below will be removed to more clearly describe the present invention. Like reference numerals in the drawings denote like elements.

The process of graphics rendering uses a large number of shader threads for performing matrix-vector multiplication, exponentiation, square root calculations, etc. An object forming a three-dimensional (3D) model includes a plurality of polygons; graphics systems typically assume objects are made of polygons. A color value and a coordinate value of a vertex of a polygon can be calculated by using a geometry shader program and a vertex shader program, whereas color values of pixels can be calculated by using a pixel shader program. Each object includes a large number of polygons and the same vertex shader program is applied to each vertex of the polygons, and the same pixel shader program is applied to pixels forming each of the polygons.

Figure 1:
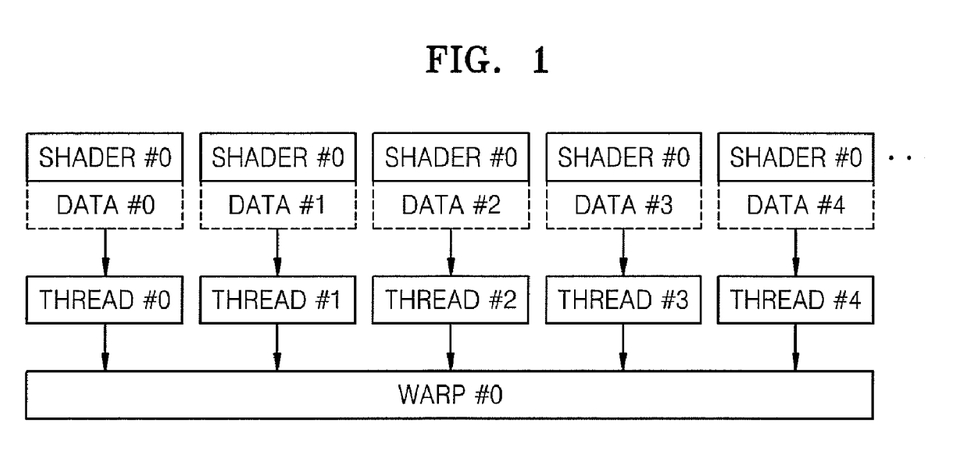
FIG. 1 illustrates relationships among threads that are formed of shader programs and data, warps, and single instruction multi data (SIMD) structures.

FIG. 1 illustrates relationships among threads that are formed of shader programs and data, warps, and single instruction multi data (SIMD) structures. Referring to FIG. 1, the same shader program, shader #0, is applied to a plurality of data, data #0, . . . , data #4, and execution of a single program with respect to a single piece of data is referred as a thread. In an SIMD structure, a single program can be executed with respect to a plurality of data, and thus a plurality of threads can be executed simultaneously. A group of a plurality of threads that are executed simultaneously is referred as a warp.

Figure 2:
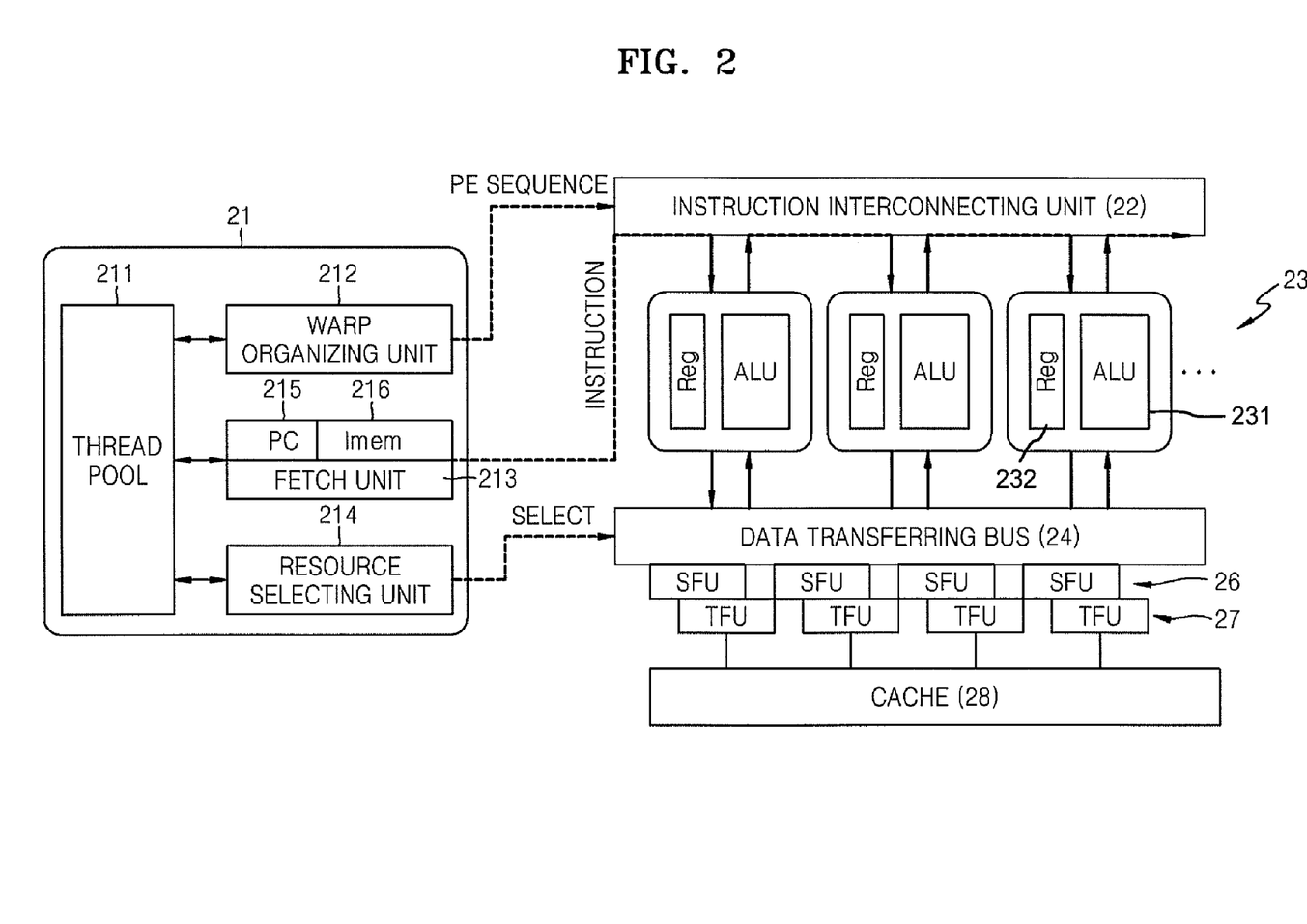
FIG. 2 illustrates a systolic-based array system for executing a single program multiple data (SPMD) shader program according to an embodiment of the present invention.

FIG. 2 illustrates a systolic-based array system for executing a single program multiple data (SPMD) shader program according to an embodiment of the present invention. Execution of a thread in a SPMD structure needs a processing element (PE) for executing a thread and a register or a cache memory accessible by the PE. The system illustrated in FIG. 2 includes a control unit 21, an instruction interconnecting unit 22, a plurality of PEs 23, a data transferring bus 24, a plurality of Special Function Units (SFU) 26, a plurality of texture fetch units (TFU) 27, and a cache memory 28 for storing texture data.

The control unit 21 includes a thread pool 211, a warp organizing unit 212, a fetch unit 213, and a resource selecting unit 214. The control unit 21 transmits threads, organizes warps, and fetches instruction streams in a method similar to the method used in a conventional SIMD-based shader. Available threads are stored in the thread pool 211, and thread IDs are transmitted to each of the PEs 23. The control unit 21 may further include a single program counter (PC) 215 and an instruction memory (Imem) 216 for executing threads. Although a mechanism of fetching an instruction is the same as that of a SIMD structure, instructions are transmitted to PEs in the form of pipelines. According to an exemplary embodiment of the present invention, instructions are transmitted to neighboring PEs by switching a network interconnecting PEs, rather than being broadcast via a bus.

In the structure illustrated in FIG. 2, the instruction interconnecting unit 22 is embodied in a switch type unit and transmits instructions output by the control unit 21 to corresponding PEs. The SFU 26 and the TFU 27 are connected to the data transferring bus 24 such that the amount of resources transmitted are reduced and the reduced resources can be shared and used efficiently by all of the PEs 23. The TFU 27 is connected to the cache 28 and writes/reads texture data needed for graphics thereto/therefrom to reduce an access time as compared to writing/reading texture data to/from a general storage unit such as a hard disk drive (HDD) for faster data processing.

The PE 23 executes a thread based on an instruction transmitted from the control unit 21. Typically, each of the PEs 23 includes an arithmetic logic unit (ALU) 231 and a register 232 to perform four groups of instructions; general arithmetic logic instructions, branch instructions, texture instructions, and special logic instructions. Although each of the PEs 23 can request a shared resource, that is, the SFU 26 or TFU 27, only a limited number of PEs 23 having priority can use the resources at an arbitrary time. The resource selecting unit 214 of the control unit 21 manages access priority and data transfer through the data transferring bus 24.

Figure 3:
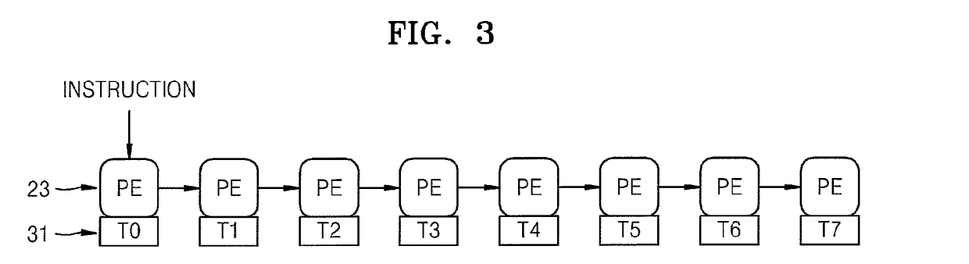
FIG. 3 illustrates a process for allocating a single thread to each PE using the same shader program.

According to an exemplary embodiment, PEs are interconnected in a systolic structure, and resources are shared in the form of pipelines. When a warp is executed, the control unit 21 allocates one thread to each PE by using the same shader program as illustrated in FIG. 3.

When a shader program is executed, the fetch unit 213 fetches instructions corresponding to the PC 215 at every cycle and transfers the fetched instructions to the first PE through the instruction interconnecting unit 22. Threads 31, which execute the same shader program with respect to different data, are allocated to each of the PEs 23. As illustrated in FIG. 3, 8 threads T0 through T7, which form a warp, are allocated to 8 PEs, respectively.

Figure 4:
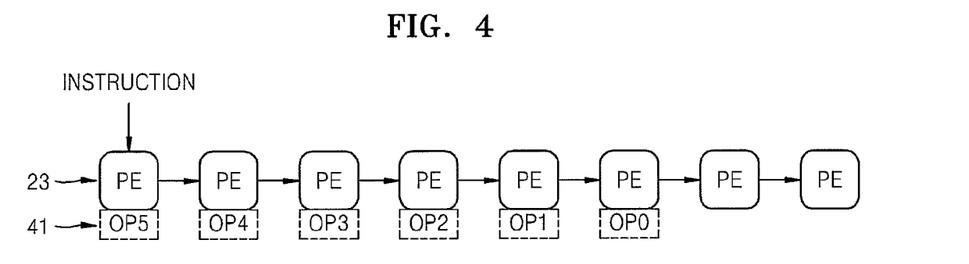
FIG. 4 illustrates a systolic type instruction transfer method.

FIG. 4 illustrates a systolic type instruction transfer method. As illustrated in FIG. 4, the control unit 21 transfers an instruction to the first PE according to an execution sequence. Each PE executes a received instruction of a thread 41 and then transfers the instruction executed by itself to an adjacent PE at every cycle. In other words, the first PE executes OP0, which is the first instruction, at the first cycle, and the sixth PE executes the OP0 at the sixth cycle. At the sixth cycle, the first PE executes OP5.

Figure 5A:
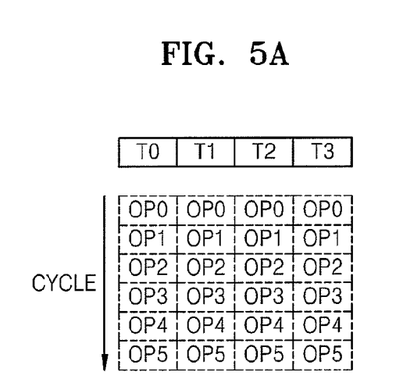
FIGS. 5A and 5B illustrate sequences of instruction execution in an SIMD structure and a systolic structure, respectively.
Figure 5B:
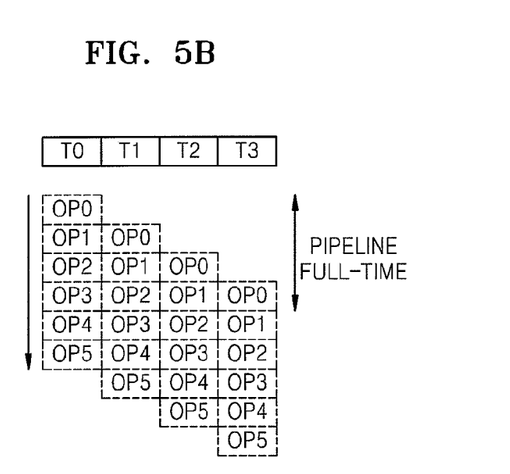

FIGS. 5A and 5B illustrate sequences of instruction execution in an SIMD structure and a systolic structure, respectively. As illustrated in FIGS. 5A and 5B, each PE executes instructions received at every cycle in the SIMD structure. In contrast, the first instruction OP0 is transmitted to PE5 five cycles after the OP0 is executed in PE0 in the systolic structure. At this point, the end of a warp is delayed for a pipeline fill time, which is a time period needed to complete a pipeline according to an array width, as illustrated in FIG. 5B. Overall PE usage is not decreased, because the control unit 21 can quickly load a new warp after the PE0 completes its thread. Accordingly, the systolic structure and the management technique can improve the overall performance by reducing an idle time of PEs generated by resource collisions and accesses to texture cache.

Figure 6A:
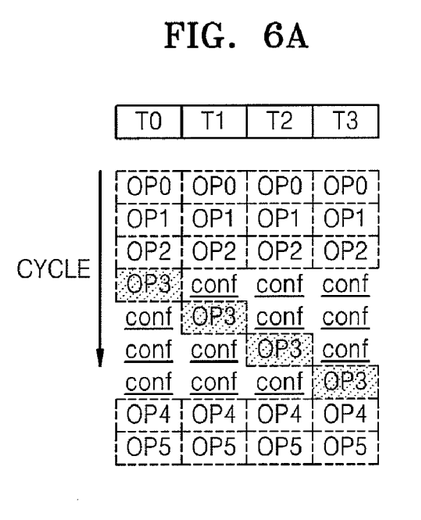
FIGS. 6A through 6C illustrate cases in which a PE collides with other PEs in a resource request.
Figure 6B:
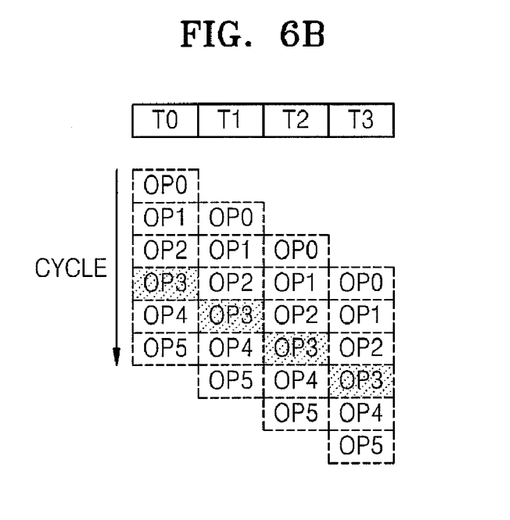
Figure 6C:
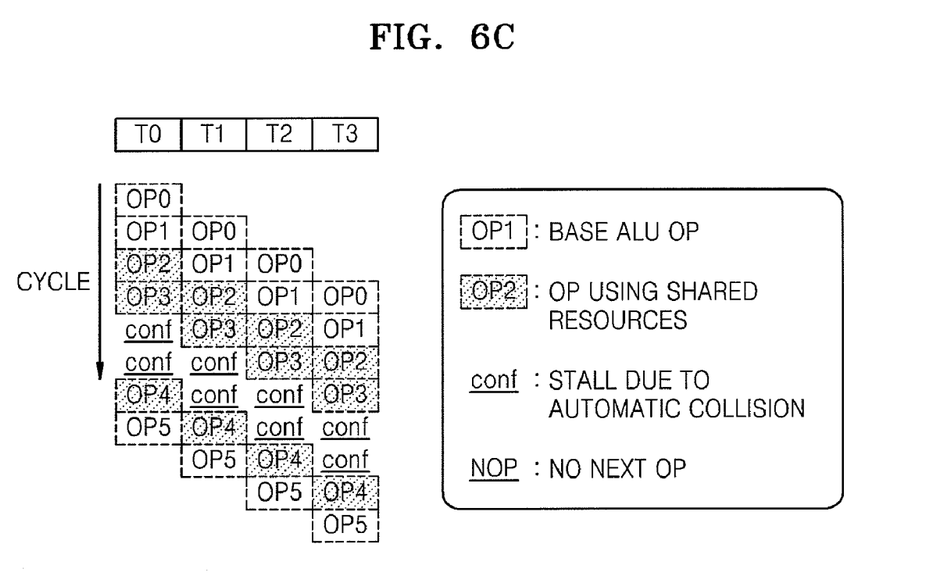

FIGS. 6A through 6C illustrate cases in which a PE collides with other PEs in a resource request. FIGS. 6A and 6B illustrate cases in which one SFU is shared in an SIMD structure and a systolic structure according to an exemplary embodiment, respectively. FIG. 6C illustrates a case in which two SFUs are shared in a systolic structure.

In FIG. 6A, when an instruction OP3 is executed, PE0 collides with other PEs. Thus, the instruction OP3 is sequentially executed in each of the PEs, and other PEs stall, that is, stop executing instructions. When the execution of the instruction OP3 is completed, a next instruction is executed.

In the systolic structure illustrated in FIG. 6B, threads are pipelined to neighboring PEs at every cycle, and thus each PE uses all shared resources without stopping. However, if resource sharing instructions are issued consecutively, a resource collision occurs. When the collision occurs, the control unit 21 gives a priority to the oldest thread according to a right-node-first policy. As illustrated in FIG. 6C, when instruction OP4 of thread T0, instruction OP3 of thread T1, and instruction OP2 of thread T2 access two SFUs, that is, at the fifth cycle, the control unit 21 gives the priority to the threads T1 and T2 to execute the instructions OP3 and OP2, and the thread T0 stalls. When an arbitrary thread stalls, there is no instruction to be transferred to a thread chained to the stalled thread, and thus the thread chained to the stalled thread also stalls.

FIGS. 7A through 7D illustrate the rearrangement of PEs in the case where a cache miss occurs during execution of a texture instruction.

A texture instruction is for calculating a texture sample address and fetching a corresponding texture from the cache 28 to execute a thread. However, if the corresponding texture is missing in the cache 28, subsequent instructions cannot be executed. In this case, a currently executed warp is replaced with another warp in a block multi-warp structure, and a storage unit (not shown) storing textures is accessed and the corresponding texture is fetched to the cache 28. Then, the new warp is executed. The above-described warp switching technique uses a memory for temporarily storing the currently executed warp. Furthermore, the warp switching technique needs not only to flush the currently executed warp, but also to store thread contexts such as a PC and register values.

In a SIMD structure, a thread in which a cache miss occurred is discarded. A cached value from the storage unit can be reused when a new thread is allocated in a next warp. However, performance of the execution of the texture instruction deteriorates since the contexts of the currently executed thread are not stored.

In the case where desired texture data is not stored in the cache 28, that is, in the case where the cache miss occurs, a corresponding PE is rearranged in the systolic structure according to an exemplary embodiment of the present invention. As a result, sequences of transferring instructions are changed in some of the PEs. When the cache miss occurs, the corresponding PE requests the control unit 21 to fetch the corresponding texture from the storage unit and store the corresponding texture in the cache 28. The control unit 21 flushes the corresponding thread without storing the contexts of the currently executed thread in the corresponding PE, and transfers the flushed thread to the thread pool 211. To increase overall PE usage, the cache-missed PE is either connected to the last PE of the PE array and receives an instruction from the last PE or receives a new instruction from the previous PE when a new thread is allocated.

FIGS. 7A through 7D illustrate processes whereby the control unit 21 controls a cache-missed PE in a systolic structure according to an embodiment of the present invention, respectively.

Figure 7A:
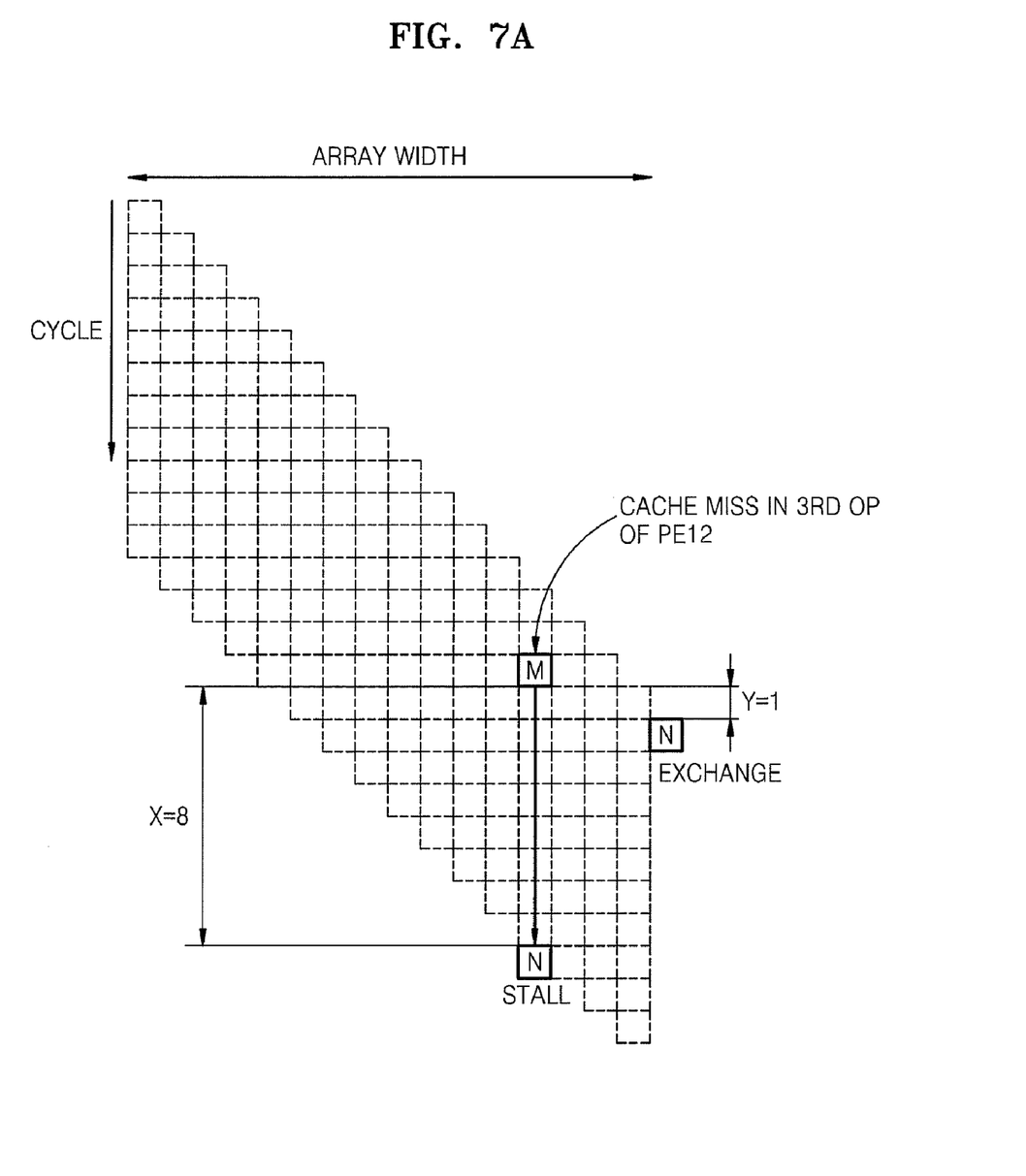
FIGS. 7A through 7D illustrate the rearrangement of PEs in the case where a cache miss occurs during execution of a texture instruction.

The control unit 21 flushes a thread from the cache-missed PE, and compares the number of cycles X needed for the PE to complete a current thread and the number of cycles Y needed for the PE to be rearranged to the last PE of the PE array and to execute a new thread. If it is determined that Y is smaller than X, the PE is connected to the last PE of the PE array to become a tail PE, as illustrated in FIG. 7A. Since Y is smaller than X, it is preferable to connect the cache-missed PE to the last PE of the PE array.

Figure 7B:
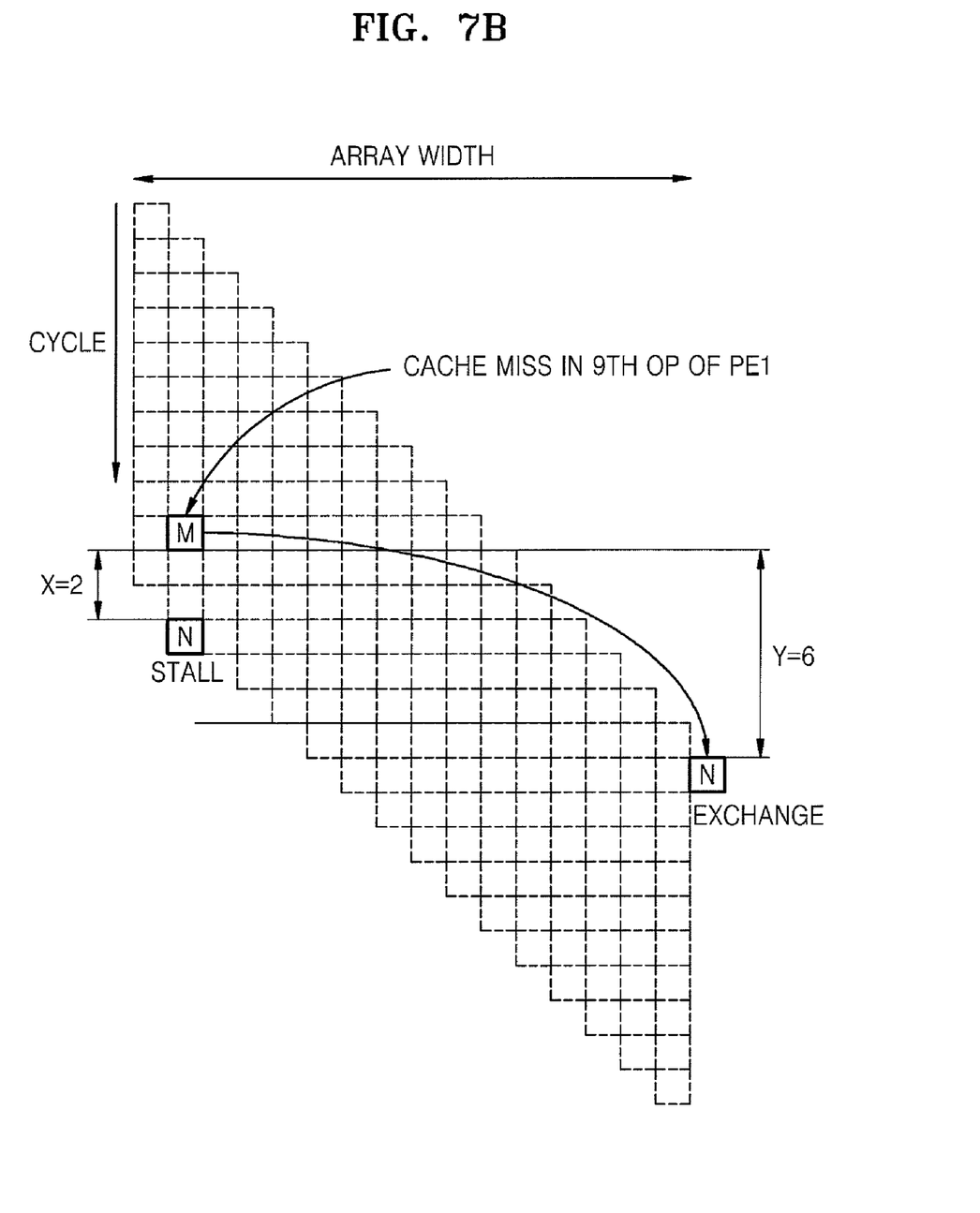

In the case where X is smaller than Y as illustrated in FIG. 7B, it is preferable to stall the corresponding PE in a view of PE usage until a new warp begins.

Figure 7C:
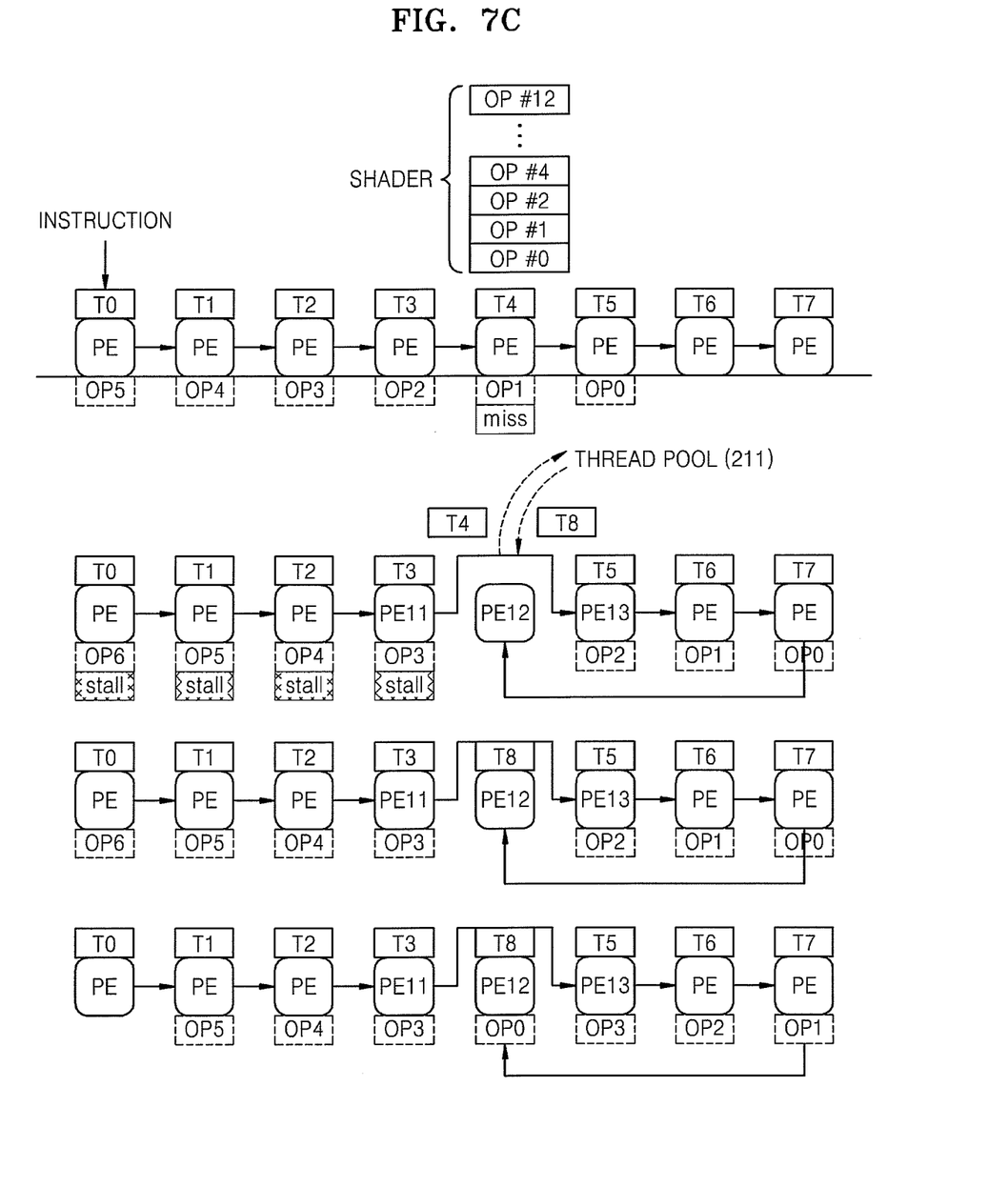

FIG. 7C illustrates the process shown in FIG. 7A. Referring to FIG. 7C, when a cache miss occurs in thread T4, the control unit 21 stops fetching instructions and stalls operations of PE0 through PE12. Furthermore, thread T4 is flushed from the PE12 and is transferred to the thread pool 211. The PE12 is still connected to the current warp and is connected to the last PE of the PE array, becoming the tail PE of the current warp, and receives thread T8 from the thread pool 211. In the rearranged PE array, PE13 receives instructions from the PE11.

Figure 7D:
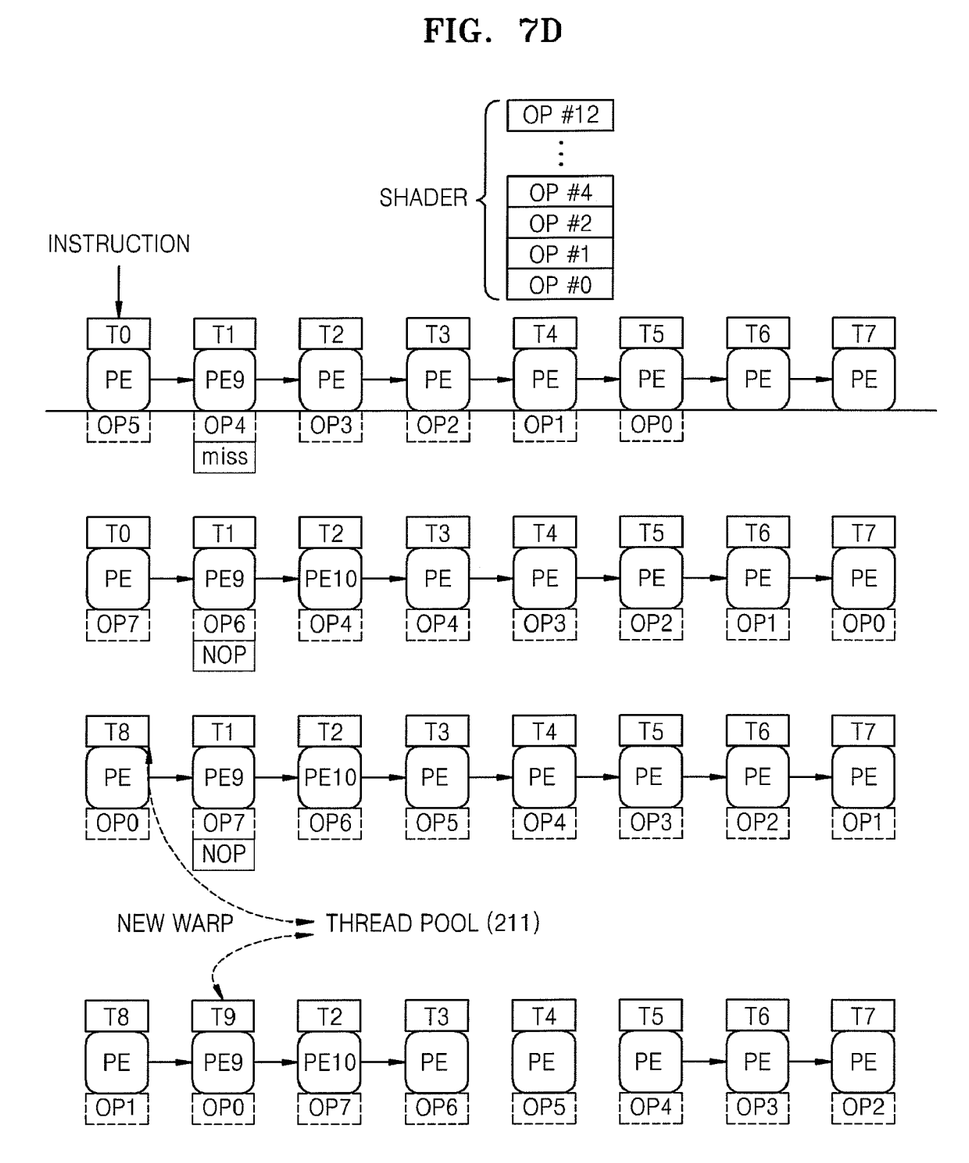

FIG. 7D illustrates the process shown in FIG. 7B. FIG. 7D illustrates stalling of the corresponding PE when the cache miss occurs in thread T1. When the cache miss occurs in thread T1, PE9 stalls at every cycle and only transfers the next instructions to the PE10 without executing the instructions. When the next warp begins, the PE9 receives and executes new thread T9.

Figure 8A:
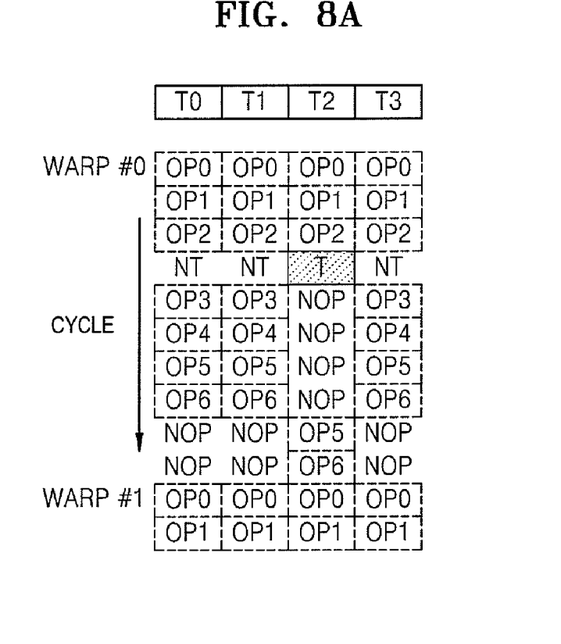
FIGS. 8A and 8B illustrate branch processes occurring in threads respectively in a SIMD structure and a systolic structure according to the embodiment of the present invention.
Figure 8B:
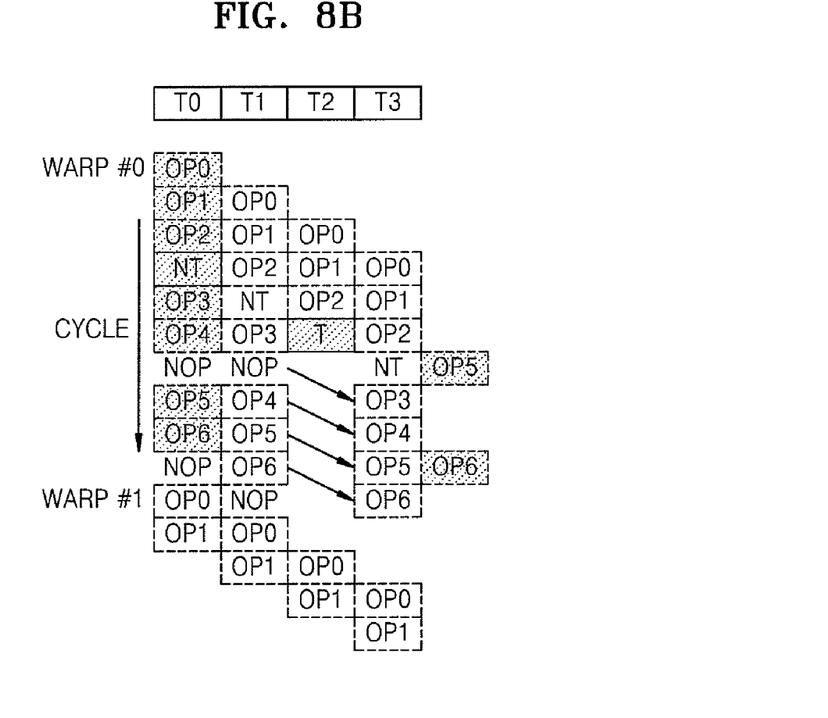

FIGS. 8A and 8B illustrate branch processes occurring in threads respectively in a SIMD structure and a systolic structure according to an exemplary embodiment of the present invention.

In the SIMD structure, when a conditional branch instruction OP2 is fetched while both the control unit 21 and the PE array perform normal operations, it is determined whether to branch in each thread. A PE which is taken (T) to branch does not perform any operations, whereas a PE which is not taken (NT) to branch performs the normal operation in the next cycle.

After branching in thread T2 is completed, the corresponding branched PE executes remaining instructions OP5 and OP6. Meanwhile, other PEs stall for a warp synchronization, and execute the next warp together with the branched PE after the branched PE executes the remaining instructions.

In the systolic structure, when a branch occurs in thread T2, the branched PE is connected to the last PE of the PE array in the next cycle, becoming the tail PE of the current warp, receives to execute instruction OP5 for thread T2 from the control unit 21. Furthermore, PEs prior to the branched PE do not perform any operations.

In order to fit code sequences of thread T2' of the tail PE with code sequences of the original thread T2, the control unit 21 determines a cycle to execute the remaining instruction OP6 of thread T2', and PEs in which the current warp is completed at the corresponding cycle do not perform the next operation.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed by a processor (e.g., GPU) in a distributed fashion.

In alternative embodiments, hard-wired circuitry may be used in place of or in combination with processor/controller programmed with computer software instructions to implement the invention. Thus embodiments of the invention are not limited to any specific combination of hardware circuitry and software.

As described above, preferred embodiments of the present invention have been described with reference to the attached drawings. The meaning of the terms used in the present specification and claims of the present invention should not be limited to be of ordinary or literary meaning but construed as meanings and concepts not departing from the spirit and scope of the invention. Accordingly, it will be understood by those skilled in the art that various changes in form and details may be made therein without departing from the spirit and scope of the invention as defined by the appended claims. Therefore, the scope of the invention is defined not by the detailed description of the invention but by the appended claims.

What is claimed is:

1. A data processing device comprising:
a PE (processing element) array comprising a plurality of PEs executing a warp of threads, each of the PEs executing a respective thread with respect to different data according to a plurality of instructions of a program by pipelining sequentially input ones of the plurality of instructions to a subsequent PE of the plurality of PEs at each cycle for executing the program; and
a control unit inputting a new instruction to a first PE of the PE array at each cycle,
wherein, when a branch-taking PE of the PE array takes a branch during the execution of the thread, all non-branching PEs in the PE array stall the respective threads for at least one cycle for synchronizing the PE array wherein the branch-taking PE executes at least one instruction of the branch and is synchronized for execution of a next warp of threads.

2. The data processing device of claim 1, further comprising:
at least one special instruction unit shared by the plurality of PEs for executing at least one instruction of the plurality of instructions transferred from the PE array for priority execution of the at least one special instruction; and
at least one texture fetch unit for executing at least one texture instruction of the plurality of instructions transferred from the PE array, wherein the program is a graphic shader.

3. The data processing device of claim 2, wherein the texture fetch unit further comprises a cache, accessible faster than a general storage unit, and which temporarily stores texture data and provides the texture data faster than general storage unit in response to a request for the texture data from the at least one texture fetch unit.

4. The data processing device of claim 3, wherein the control unit flushes a currently executing thread from a cache-missed PE of the PE array in which a cache miss occurs and outputs the flushed thread to a thread pool, wherein a preceding PE and a subsequent PE of the cache-missed PE are connected to preserve the pipelining.

5. The data processing device of claim 4, wherein the control unit connects the cache-missed PE to a last PE of the PE array upon determining that a number of cycles required for the cache-missed PE to complete execution of the currently executing thread is greater than a number of cycles required to wait until the cache-missed PE executes a new thread.

6. The data processing device of claim 2, the control unit comprising:
a thread pool for storing a plurality of threads for input to the PE array;
a resource selecting unit connecting one of a plurality of resources, which includes the at least one special instruction unit and the at least one texture fetch unit, to a corresponding PE for instruction execution required by the thread executed by each of the PEs; and
a fetch unit outputting the new instruction to the first PE at each cycle.

7. The data processing device of claim 6, wherein a priority for using the resources is given to a PE executing an oldest thread upon a collision between the PEs.

8. The data processing device of claim 7, wherein a PE which fails to receive the priority stalls and does not execute an instruction.

9. The data processing device of claim 1, wherein the control unit determines the at least one cycle of a stalled PE for executing at least one instruction of the thread of the branch-taking PE subsequent to the branch operation.

10. A method of processing data, the method comprising:
fetching an instruction of a program to a first PE (processing element) of a PE array at each cycle; and
executing a warp of threads with respective different data in the PE array, the warp of threads executing the program in parallel,
wherein the instruction is pipelined from the first PE to a subsequent PE in the PE array,
wherein, when a branch-taking PE of the PE array takes a branch during the execution of the thread, all non-branching PEs in the PE array stall the respective threads for at least one cycle for synchronizing the PE array wherein the branch-taking PE executes at least one instruction of the branch and is synchronized for execution of a next warp of threads.

11. The method of claim 10, further comprising flushing a currently executing thread from a cache-missed PE upon a cache miss occurring in the PE wherein a preceding PE and a subsequent PE of the cache-missed PE are connected to preserve the pipelining.

12. The method of claim 11, further comprising connecting the cache-missed PE to a last PE of the PE array upon determining that a number of cycles required for the cache-missed PE to complete execution of the currently executing thread is greater than a number of cycles required to wait until the cache-missed PE executes a new thread.

13. The method of claim 10, further comprising giving priority for using a resource to a PE executing an oldest thread upon a collision between the PEs.

14. The method of claim 13, wherein a PE which fails to receive the priority stalls and does not execute an instruction.

15. The method of claim 10, further comprising determining the at least one cycle of a stalled PE for executing at least one instruction of the thread of the branch-taking PE subsequent to the branch operation.

* * * * *